United States Patent [19]

Walla

[11] 4,315,103
[45] Feb. 9, 1982

[54] SPEECH-CONTROLLED LOUDSPEAKER TELEPHONE STATION CIRCUIT

[75] Inventor: Klaus Walla, Gauting, Fed. Rep. of Germany

[73] Assignee: Siemens Aktiengesellschaft, Berlin & Munich, Fed. Rep. of Germany

[21] Appl. No.: 73,569

[22] Filed: Sep. 7, 1979

[30] Foreign Application Priority Data

Sep. 28, 1978 [DE] Fed. Rep. of Germany ....... 2842369

[51] Int. Cl.³ .............................................. H04M 9/08
[52] U.S. Cl. ................................................. 179/1 VC
[58] Field of Search ..................................... 179/1 VC

[56] References Cited

U.S. PATENT DOCUMENTS 3,610,835 10/1971 Reid ................................. 179/1 VC
3,876,835 4/1975 Barnaby et al. ................. 179/1 VC

FOREIGN PATENT DOCUMENTS 1282720 11/1968 Fed. Rep. of Germany .
2816265 9/1979 Fed. Rep. of Germany ... 179/1 VC

*Primary Examiner*—Stuart N. Hecker
*Attorney, Agent, or Firm*—Hill, Van Santen, Steadman, Chiara & Simpson

[57] ABSTRACT

A circuit arrangement for a speech-controlled loudspeaker telephone station incorporates a pair of operational amplifiers for receiving voltages proportional to the microphone voltage and the loudspeaker voltage, and apparatus for rectifying and comparing the output voltages of the operational amplifiers, to supply control signals for selectively controlling operation of attenuators in the transmitting and receiving channels.

10 Claims, 1 Drawing Figure

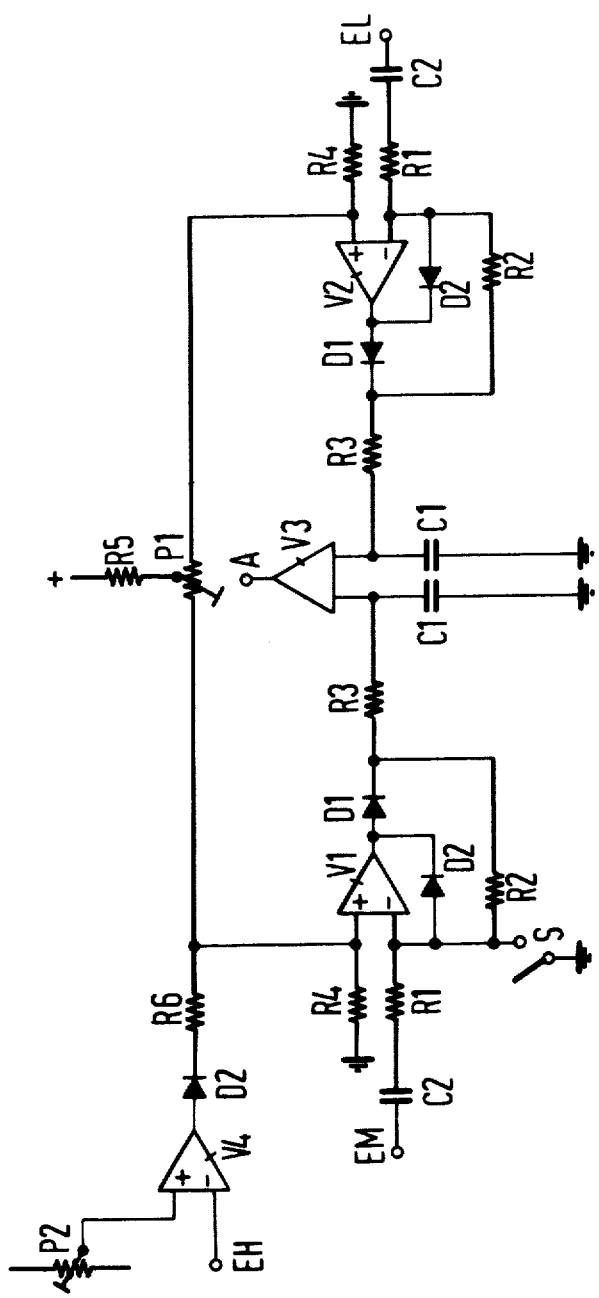

SPEECH-CONTROLLED LOUDSPEAKER TELEPHONE STATION CIRCUIT

FIELD OF THE INVENTION

The present invention relates to a circuit arrangement for a speech-controlled loudspeaker telephone station and in particular to a system using such station with individual channel amplifiers and with a speech direction recognition circuit.

THE PRIOR ART

In systems employing loudspeaker telephone stations, in order to avoid the possibility of positive feedback, either the transmitting device or the receiving device should be attenuated when the other is not. The control of the attenuators is directed by a speech direction recognition circuit, which determines the direction of transmission of communication, and controls the attenuators accordingly.

Such direction recognition circuits have a variety of requirements, which are partially contradictory. For example, it is desirable that no beginning syllables should be lost, and there should be an avoidance of interruptions between individual syllables. The possibility of the opposite station breaking into the conversion should be allowed, and there should be no faulty operation as the result of background noises. Past attempts to solve the problem have not resulted in completely effective solutions.

Since the signal arriving at a telephone receiver can fluctuate by a factor of 1:1000, it is necessary that a speech direction recognition circuit must work over a wide dynamic range, handling signals between 1 mV and 1 V. When the incoming signal is first rectified before producing a control signal of some kind, the threshold voltage of the rectifying system introduces an error, because such threshold voltage is typically a few tenths of a volt. When preamplification is employed, so that the signals with the lowest expected amplitude of 1 mV are raised to approximately 0.7 V, the threshold voltage is no longer a problem, but the maximum signal voltage could then rise to as high as 700 V, introducing additional problems. Attempts to solve this problem have employed the use of logarithmic control amplifiers, the output voltages of which are proportional to the logarithm of the amplified input signals. The logarithmic amplifiers are relatively expensive, however, and it is desirable to provide a simpler and less expensive circuit for speech direction recognition.

BRIEF DESCRIPTION OF THE INVENTION

It is a principal object of the present invention to provide a simple and economical circuit for speech direction recognition.

In one embodiment of the present invention, a pair of inverting operational amplifiers are employed for receiving the microphone and loudspeaker voltages, which amplifiers employ level-dependent negative feedback with separate feedback paths for the positive and negative-going half-cycles of the signals. A comparator, coupled to the outputs of the operational amplifiers, produces a signal for controlling the attenuators.

The use of the operational amplifiers makes the rectifier diodes essentially independent of threshold voltage, so that large level fluctuations can be accommodated.

BRIEF DESCRIPTION OF THE DRAWING

Reference will now be made to the accompanying drawing which shows a schematic diagram of an illustrative embodiment of the present invention.

DESCRIPTION OF THE PREFERRED EMBODIMENT

The drawing illustrates two inverting operational amplifiers V1 and V2, each of which has level-dependent negative feedback. Each amplifier has two negative feedback paths, one for the positive half-cycles of the output voltage of the operational amplifier, and the other for the negative half-cycles. A circuit including a diode D1 and a resistor R2 are provided for the positive half-cycles, and the diode D2 is provided for the negative half-cycles.

The microphone voltage is supplied to a terminal EM, and is passed through a capacitor C2 and a resistor R1 to the inverting input of the amplifier V1. In similar fashion, the remote signal, which is diverted from the loudspeaker voltage, is fed to the terminal EL, and passes through a similar resistor capacitor combination to the inverting input of the amplifier V2. The non-inverting inputs of both amplifiers are connected by a resistor R4 to a reference potential, and also to a bias supply described in more detail hereinafter.

When the output of the operational amplifier V1 is negative-going, current is drawn through the diode D2 so as to maintain the potential at the inverting input of the amplifier approximately equal to that on the non-inverting input. When the output of the operational amplifier is positive, feedback current flows through the diode D1 and the resistor R2 to the inverting input, in sufficient quantity to continue to maintain the voltage at the inverting input close to that of the non-inverting input. As a result, there is produced at the junction of the diode D2 and the resistor R2 a recitified and amplified signal corresponding to the input signal applied to the terminal EM. This is supplied to one input of a comparator V3 through a resistor R3. The input is also connected by a capacitor C1 to a reference potential, forming part of a low pass filter.

The circuit for the operational amplifier V2 is similar, and its output is connected to the other input of the comparator V3. The output of the comparator is available at terminal A, and is a binary output signal having one or another voltage level, depending on which of the two operational amplifiers V1 and V2 has a greater output. The attenuators are controlled in accordance with the control signal available at terminal A, by conventional means. The time constant of the speech direction recognition circuit is determined by the resistor R3 and the capacitor C1. The delay time is determined by the values of the capacitor C1 and the resistors R2 and R3. The gain of the amplifiers is determined by the ratio of the resistors R1 and R2.

The bias circuit incorporates an operational amplifier V4, the inverting input of which is connected to a terminal EH, to which is supplied a height regulating voltage. The non-inverting input of the amplifier V4 is connected to the tap of a potentiometer P2, which establishes a bias on the amplifier V4. The output of the amplifier V4 is connected by a diode D2 and a resistor R6 to the non-inverting input of the amplifier V1, and also to one end terminal of a potentiometer P1, the other end terminal of the potentiometer P1 being connected to the non-inverting input of the amplifier V2. The tap of the potentiometer P1 is connected by a resistor R5 to a source of positive potential. By adjusting the potentiometer P1, the relative bias supplied to the operational amplifiers V1 and V2 can be controlled. The specific value of bias supplied to these amplifiers is determined, in conjunction with the potentiometer P1, by the setting of the potentiometer P2 and the level of control voltage applied to the terminal EH.

A switch S is connected between the inverting input of the amplifier V1 and a reference potential, in order to, when closed, force the speech direction recognition circuit to the sending position, whenever that is desired.

From the foregoing, it is apparent that the present invention furnishes a simple and economical means for determining the direction of speech transmission, and for furnishing a signal which can selectively control attenuators in connection therewith. Various additions and modifications may be made in the apparatus of the present invention without departing from the essential features of novelty thereof, which are intended to be defined and secured by the appended claims.

What is claimed is:

1. A circuit arrangement for a speech-controlled loudspeaker telephone station having a microphone and a loudspeaker, comprising in combination; a first operational amplifier for receiving a signal from said microphone, and a second operational amplifier for receiving a signal proportional to the signal supplied to said loudspeaker, both of said operational amplifiers having level-dependent negative feedback including separate feedback paths including diodes for positive-going and negative-going half-cycles, and a comparator connected to one of said feedback paths to receive the rectified output voltages of said first and second operational amplifiers and for producing a signal indicative of the direction of speech transmission.

2. Apparatus according to claim 1, including a bias circuit for supplying bias to said first and second operational amplifiers, and means for selectively modifying the amount of bias supplied to said amplifiers.

3. Apparatus according to claim 1, including bias means for supplying bias to said first and second operational amplifiers, and selectively controllable means for modifying the proportion of bias supplied to said first and second operational amplifiers.

4. Apparatus according to claim 1, wherein each of said operational amplifiers have a first feedback path incorporating a first diode interconnected between the output and the inverting input of said operational amplifier and a second feedback path incorporating a second diode and resistor interconnected in series between the output and inverting input of said operational amplifier, said comparator being connected to the junction of said second diode and said resistor.

5. Apparatus according to claim 4, wherein said first and second diodes are poled oppositely relative to the output of said operational amplifier, for rectifying positive-going and negative-going half-cycles respectively.

6. Apparatus according to claim 1, including a pair of low pass filters, each of said filters being interconnected between the output of one of said operational amplifiers and an individual input of said comparator.

7. Apparatus according to claim 1, including manually controllable means for selectively forcing the output of said comparator to one of two stable output voltages.

8. Apparatus according to claim 7, wherein said controllable means comprises a switch interconnected between the inverting input of said first operational amplifier and a reference potential.

9. A circuit arrangement for a speech-controlled loudspeaker telephone station having a microphone and a loudspeaker, comprising in combination: a first operational amplifier for receiving a signal from said microphone, and a second operational amplifier for receiving a signal proportional to the signal supplied to said loudspeaker, both of said operational amplifiers having level-dependent negative feedback including separate feedback paths including diodes for positive-going and negative-going half-cycles, and a comparator connected to receive the rectified output voltages of said first and second operational amplifiers and responsive to the difference in output voltages of said first and second operational amplifiers for producing a signal indicative of the direction of speech transmission.

10. Apparatus according to claim 9, wherein said comparator comprises a differential amplifier having first and second inputs, means for connecting the output voltage of said first operational amplifier to one of said inputs, and means for connecting the output voltage of said second operational amplifier to the other input.

* * * * *